United States Patent
Bae et al.

(10) Patent No.: US 8,773,619 B2
(45) Date of Patent: Jul. 8, 2014

(54) LIQUID CRYSTAL DISPLAY AND METHOD OF MANUFACTURING POLARIZER PLATE

(75) Inventors: Chang Seok Bae, Uiwang-si (KR); Ae Kyoung Kim, Uiwang-si (KR); Hae Ryong Chung, Uiwang-si (KR); Han Su Kim, Uiwang-si (KR); Eun Jae Cho, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/330,960

(22) Filed: Dec. 20, 2011

(65) Prior Publication Data

US 2012/0154718 A1    Jun. 21, 2012

(30) Foreign Application Priority Data

Dec. 21, 2010    (KR) ......................... 10-2010-0131857

(51) Int. Cl.
*G02F 1/1335*    (2006.01)

(52) U.S. Cl.
USPC ............................. 349/96; 349/103; 349/122

(58) Field of Classification Search
USPC ............................. 349/96, 103, 117, 122, 187; 359/487.02, 489.07; 83/14; 428/1.31; 264/1.34
See application file for complete search history.

(56) References Cited

U.S. PATENT DOCUMENTS

| 2005/0275943 A1* | 12/2005 | Sugimura et al. ............ 359/490 |
| 2006/0284216 A1* | 12/2006 | Mizushima et al. .......... 257/254 |
| 2007/0200978 A1* | 8/2007 | Ishitani et al. ................. 349/96 |
| 2008/0074585 A1* | 3/2008 | Yoshimi ......................... 349/96 |
| 2010/0288441 A1* | 11/2010 | Kitada et al. .................. 156/378 |

FOREIGN PATENT DOCUMENTS

CN    101025508 A    8/2007

OTHER PUBLICATIONS

Office Action mailed Dec. 3, 2013 in corresponding Chinese Patent Application No. 201110431727.1.

* cited by examiner

*Primary Examiner* — Dung Nguyen
*Assistant Examiner* — Tai Duong
(74) *Attorney, Agent, or Firm* — Lee & Morse, P.C.

(57) ABSTRACT

A liquid crystal display includes a liquid crystal panel, a first polarizer plate stacked on an upper surface of the liquid crystal panel, and a second polarizer plate stacked on a lower surface of the liquid crystal panel. The first polarizer plate may have an absorption axis inclination of +0.1 to +0.2 degrees, or the second polarizer plate may have an absorption axis inclination of −0.04 to less than 0 or greater than 0 to +0.1 degrees.

16 Claims, 3 Drawing Sheets

LIQUID CRYSTAL DISPLAY AND METHOD OF MANUFACTURING POLARIZER PLATE

BACKGROUND

1. Field

Embodiments relate to a liquid crystal display and a method of manufacturing a polarizer plate.

2. Description of the Related Art

A liquid crystal display (LCD) is a widely used flat panel display. Generally, a liquid crystal display includes a liquid crystal layer encapsulated between a thin film transistor (TFT) array substrate and a color filter substrate. The liquid crystal display displays an image based on variation of arrangement of liquid crystal molecules in the liquid crystal layer upon application of an electric field to electrodes on the array substrate and the color filter substrate.

The liquid crystal display includes polarizer plates outside the array substrate and the color filter substrate. Each of the polarizer plates allows selective transmission of light traveling in a specific direction among light entering from a backlight unit and light passing through the liquid crystal layer, thereby achieving polarization.

SUMMARY

An embodiment is directed to a liquid crystal display, including a liquid crystal panel, a first polarizer plate stacked on an upper surface of the liquid crystal panel, and a second polarizer plate stacked on a lower surface of the liquid crystal panel. The first polarizer plate may have an absorption axis inclination of +0.1 to +0.2 degrees, or the second polarizer plate may have an absorption axis inclination of −0.04 to less than 0 or greater than 0 to +0.1 degrees.

The first polarizer plate may have an absorption axis inclination of +0.1 to +0.2 degrees.

The second polarizer plate may have an absorption axis inclination of −0.04 to less than 0 or greater than 0 to +0.1 degrees.

The second polarizer plate may have an absorption axis inclination of −0.04 to less than 0 or greater than 0 to +0.1 degrees.

At least one of the first polarizer plate and the second polarizer plate may include a polarizer, a first protective film stacked on an upper surface of the polarizer, and a second protective film stacked on a lower surface of the polarizer.

At least one of the first protective film and the second protective film may be a tri-acetyl-cellulose film.

The liquid crystal panel may include an upper substrate, a lower substrate, and liquid crystals between the upper and lower substrates, the liquid crystals being vertical arrangement mode liquid crystals.

The liquid crystal display may further include a compensation film stacked on a lower surface of the second protective film.

Another embodiment is directed to a method of manufacturing a polarizer plate, the method including preparing a polarizer, attaching a protective film to at least one side of the polarizer to prepare a polarizer plate, and cutting the polarizer plate at an inclined angle except for 0 or 90 degrees with respect to an absorption axis of the polarizer.

The inclined angle may be in the range of −0.2 to −0.1 degrees with respect to the absorption axis.

The inclined angle may be in the range of −0.1 to less than 0 or greater than 0 to +0.04 degrees with respect to a vertical direction to the absorption axis.

The polarizer may be prepared from a polyvinyl alcohol film.

The absorption axis of the polarizer may have the same direction as a stretching direction of the polarizer.

The preparing a polarizer may include rinsing and swelling the polyvinyl alcohol film, dyeing the swollen polyvinyl alcohol film, stretching the dyed polyvinyl alcohol film, and color-correcting the stretched polyvinyl alcohol film.

BRIEF DESCRIPTION OF DRAWINGS

The above and other features will become more apparent to those of skill in the art by describing in detail example embodiments with reference to the attached drawings, in which.

DETAILED DESCRIPTION OF THE INVENTION

Figure 1:
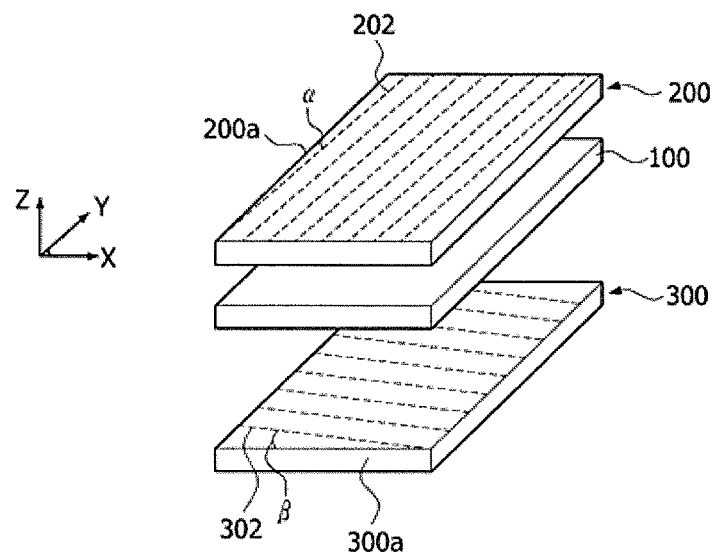
FIG. 1 illustrates a perspective view of a part of a liquid crystal display in accordance with an example embodiment.

Korean Patent Application No. 10-2010-0131857, filed on Dec. 21, 2010 in the Korean Intellectual Property Office, and entitled: "Liquid Crystal Display And Method Of Manufacturing Polarizer," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a perspective view of part of a liquid crystal display in accordance with an example embodiment.

Referring to FIG. 1, the liquid crystal display according to the present example embodiment includes a liquid crystal panel 100. The liquid crystal display also includes first and second polarizer plates 200, 300 stacked on upper and lower surfaces of the liquid crystal panel 100, respectively.

As used herein, the terms "upper" and "lower" mean one surface and the other surface of the liquid crystal panel, respectively. In other words, the upper surface is not necessarily directed upwards, and an upper or lower side of the drawing is referred to as the upper or lower surface for convenience of description.

In the liquid crystal panel 100, TN (Twisted Nematic) liquid crystals, STN (Super Twisted Nematic) liquid crystals, horizontal or vertical arrangement mode liquid crystals, such as IPS (In-Plane Switching), Super-IPS, or FFS (Fringe Field Switching) may be encapsulated between an upper substrate and a lower substrate (not shown in FIG. 1). The upper substrate may be a color filter substrate, and the lower substrate may be a TFT array substrate. The upper substrate and the lower substrate may be glass substrates or flexible plastic substrates. Although a vertical arrangement mode liquid crystal display will be described in this embodiment, it should be understood that embodiments may be applied to any liquid crystal mode.

Each of the first and second polarizer plates 200, 300 has an absorption axis (polarizing axis) of light inclined at a certain angle. The angle will be referred to as an absorption axis inclination.

An angle of an absorption axis 202 of the first polarizer plate 200 with respect to one side 200a of the first polarizer plate 200, which is close to the absorption axis and arranged in the absorption axis direction of the first polarizer plate 200 will be referred to as an absorption axis inclination ($\alpha$) of the first polarizer plate 200. In other words, the angle of the absorption axis 202 of the first polarizer plate 200 with respect to one side 200a of the first polarizer plate 200, which is close to the absorption axis and arranged in the absorption axis 202 of the first polarizer plate 200, will be referred to as the absorption axis inclination ($\alpha$) of the first polarizer plate.

An angle of an absorption axis 302 of the second polarizer plate 300 with respect to one side 300a of the second polarizer plate 300, which is close to the absorption axis and arranged in the absorption axis direction of the second polarizer plate 300, will be referred to as an absorption axis inclination ($\beta$) of the second polarizer plate. In other words, the angle of the absorption axis 302 of the second polarizer plate 300 with respect to one side 300a of the second polarizer plate 300, which is close to the absorption axis and arranged in the absorption axis direction 302 of the second polarizer plate 300, will be referred to as the absorption axis inclination ($\beta$) of the second polarizer plate.

When the second polarizer plate 300 is viewed from above the first polarizer plate 200 (see FIG. 1), an angle oriented in the clockwise direction will be indicted by a plus mark (+) and an angle oriented in the counterclockwise direction will be indicated by a minus mark (−), and the one side 200a of the first polarizer plate is substantially orthogonal to the one side 300a of the second polarizer plate. Thus, in the example shown in FIG. 1, the absorption axis inclination ($\alpha$) of the first polarizer plate 200 is (+) and the absorption axis inclination ($\beta$) of the second polarizer plate is also (+).

The liquid crystal display according to the present example embodiment may provide a high contrast ratio when the first polarizer plate has an absorption axis inclination ($\alpha$) in the range of +0.1 to +0.2 degrees or the second polarizer plate has an absorption axis inclination ($\beta$) in the range of −0.04 to less than 0 or greater than 0 to +0.1 degrees.

Figure 2:
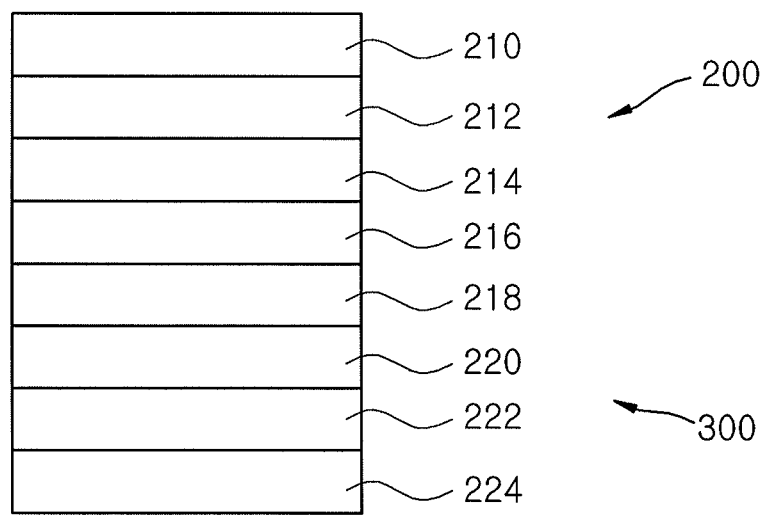
FIG. 2 illustrates a cross-sectional view of a polarizer plate in accordance with an example embodiment.

FIG. 2 illustrates a cross-sectional view of a polarizer plate in accordance with an example embodiment.

Referring to FIG. 2, the polarizer plate 200/300 (i.e., the polarizer plate may be the first polarizer plate 200 or the second polarizer plate 300) according to the present example embodiment may include first and second protective films 212, 216, which are respectively stacked on upper and lower surfaces of a polarizer 214 that includes a stretched polyvinyl alcohol film.

The first protective film 212 and the second protective film 216 may be used to protect the polarizer 214, and may include, e.g., polycarbonate films, polyamide films, polyimide films, polyolefin films, polyester films, polyether sulfone films, cellulose films such as tri-acetyl-cellulose (TAC) films, etc.

A third protective film 210 may be stacked on an upper surface of the first protective film 212. A compensation film 220 may be stacked on a lower surface of the second protective film 216 via a first adhesive layer 218. A release film 224 may be stacked on a lower surface of the compensation film 220 via a second adhesive layer 222. The compensation film 220 may be a retardation film for compensation of the viewing angle, and the third protective film 210 and the release film 224 may be used to protect the polarizer plate and may include a polyethylene terephthalate (PET) film exhibiting excellent optical characteristics and strength.

An example of the polarizer plate applicable to vertical arrangement mode liquid crystal panels is shown in FIG. 2, but various implementations may be used. For example, the polarizer plate may omit the first adhesive layer 218 and the compensation film 220. In another implementation, the polarizer plate may further include an antiglare (AG) layer, an antireflective coating (ARC) layer, etc., on the upper surface of the first protective film 212.

In the liquid crystal display according to the present example embodiment, a polarizer plate having an absorption axis inclination such as +0.1 to +0.2 degrees or −0.04 to less than 0 or greater than 0 to +0.1 degrees may be provided as at least one of the first and second polarizer plates 200, 300, so as to increase the contrast ratio of the liquid crystal display. Such a polarizer plate may be manufactured by a method as described below.

Another example embodiment to a method of manufacturing a polarizer plate. The method may include a process of preparing a polarizer, a process of attaching a protective film, and a process of cutting the polarizer plate.

Process of Preparing Polarizer

According to an embodiment, a process of preparing polarizer may include rinsing/swelling a film for polarizer, dyeing, stretching, color-correcting, and the like, instead of being simply a stretching process. The film for polarizer, for example, a polyvinyl alcohol (PVA) film, may be used as described hereinafter.

The film for polarizer may be selected from among any commercially available polyvinyl alcohol films. The film for polarizer may be produced by solvent casting, melt extrusion, or the like. In solvent casting, a resin solution prepared by dissolving a resin in a solvent is coated on a casting roll or belt, followed by evaporation of the solvent, thereby producing a desired film. In melt extrusion, a resin is melted at a melting point or higher, followed by extrusion and cooling through cooling rolls, thereby producing a desired film. A solution for preparing the film may include a plasticizer for enhancing flexibility of the polyvinyl alcohol film and a surfactant for facilitating separation of the dried polyvinyl alcohol film from a belt or drum.

For example, the polarizer may be manufactured by stretching the prepared polyvinyl alcohol film or commercially available polyvinyl alcohol film. The following processes for manufacturing the polarizer are provided for illustration only, and thus the method may further include other processes not described herein or may eliminate some processes described herein. Further, it should be understood that the following numerals do not indicate the sequence of the processes, which can be changed as needed.

1) Rising and Swelling

Rinsing and swelling of the film for polarizer, e.g. the polyvinyl alcohol film may be performed before dyeing the polyvinyl alcohol film. Rising may be performed to remove foreign matter from the polyvinyl alcohol film, and swelling may be performed to guarantee an efficient dyeing process. For example, the polyvinyl alcohol film may be passed through a swelling bath, which may accommodate water or chloride, boric acid, an inorganic acid, an organic solvent, or the like, and may be maintained at a temperature of 20° C. to 30° C. Preparation and selection of the swelling bath may be easily carried out by a person having skill in the art.

2) Dyeing

The swollen polyvinyl alcohol film may be subjected to dyeing with a dichroic material, which imparts polarization properties to the film. The dichroic material is a material which exhibits great difference in the degree of light absorption between a major axis and a minor axis thereof, and any suitable material that selectively absorbs only one component of polarized light components orthogonal to each other may be used as the dichroic material to provide polarization properties. For example, iodine, dichroic pigments, and the like may be used.

When dyeing the polyvinyl alcohol film with iodine molecules, an iodine dyeing bath may include potassium iodide or boric acid in addition to iodine. The iodine dyeing may be performed at a temperature of 20° C. to 40° C.

After dyeing, the polyvinyl alcohol film may be further subjected to crosslinking. For example, in order to allow the iodine molecules to be more strongly attached to the polyvinyl alcohol matrix, boric acid may be used as a crosslinking agent and phosphoric acid may be further added thereto.

3) Stretching

The dyed polyvinyl alcohol film may be subjected to stretching. A dry stretching method or a wet stretching method may be performed for this process. Examples of the dry stretching may include an inter-roll stretching method, a compression stretching method, a heated roll stretching method, and the like.

A bath for wet stretching may contain boric acid and may be maintained at a temperature in the range of 35° C. to 65° C. Stretching may be performed simultaneously with dyeing or crosslinking. When stretching is performed simultaneously with dyeing, these processes may be performed in an iodine solution, and when stretching is performed simultaneously with crosslinking, these processes may be performed in a boric acid solution.

4) Color Correcting

The stretched polyvinyl alcohol film may be subjected to color correction for color calibration of the polyvinyl alcohol film. Color correction may be performed in a color correction bath which contains, e.g., potassium iodide and/or boric acid. In an embodiment, color correcting may be performed in a color correction bath which contains 1 to 10 wt % potassium iodide and 0.1 to 3 wt % boric acid.

The manufactured polarizer according to the present invention may have a thickness of 0.5 μm to 400 μm, preferably 5 μm to 200 μm.

Process of Attaching Protective Film

When the manufactured polarizer is moved while being wound upon a winder, a process of attaching a protective film to at least one side of the polarizer may be performed.

Examples of the protective film may include cellulose films such as tri-acetyl-cellulose (TAC) films, polycarbonate films, polyamide films, polyimide films, polyolefin films, polyester films, and polyether sulfone films. Specifically, a TAC film may be used as the protective film.

The TAC film may be prepared by dissolving purified cellulose, which is obtained by removing impurities such as lignin, hemicelluloses and the like from wood pulp, followed by processing to form a film. The TAC film for liquid crystal displays preferably provides transparency, flatness and optical isotropy, and serves to protect the polarizer that polarizes light and includes polyvinyl alcohol.

Attachment of the TAC film to the stretched polyvinyl alcohol film may be achieved by, e.g., attaching the TAC film to the polyvinyl alcohol film while winding the TAC film from an unwinding roller around a winding roller. In addition to the protective film, functional films such as a compensation film and the like may be further attached to the stretched polyvinyl alcohol film.

Process of Cutting Polarizer Plate

Figure 3:
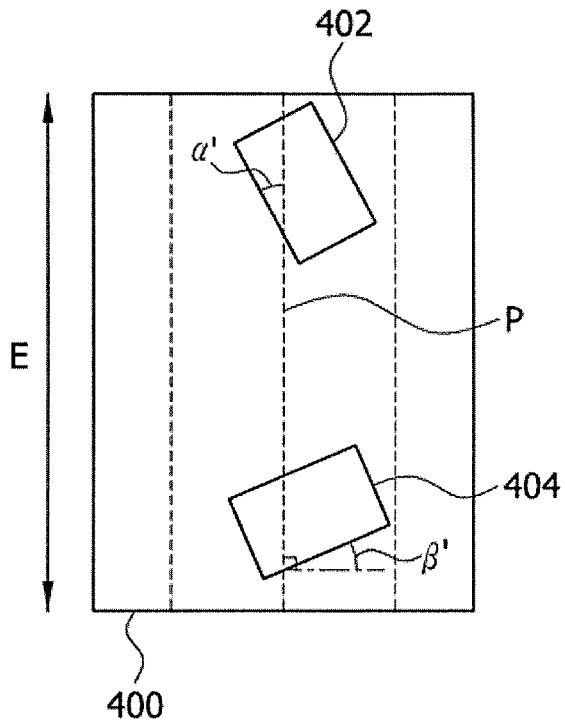
FIG. 3 illustrates a diagram of a method of manufacturing (cutting) a polarizer plate in accordance with an example embodiment.

FIG. 3 illustrates a diagram of a process of cutting a polarizer plate in accordance with an example embodiment.

Referring to FIG. 3, in the process of cutting the polarizer plate according to the present example embodiment, the polarizer plate is cut to have an inclined angle except for 0 or 90 degrees with respect to an absorption axis P of the polarizer. The absorption axis P may be an optical absorption axis of the dichroic material adhered to the polyvinyl alcohol film.

In an embodiment, the absorption axis P of the polarizer may have the same direction as a stretching direction E of the polarizer. Here, the term 'same' means that both components are substantially identical instead of being completely identical. For example, there can be a difference within allowable limits of error of a measurement instrument.

In another embodiment, the absorption axis and the stretching direction may be slightly inclined or changed in position within the polarizer according to process conditions, such as stretching and the like. For example, the absorption axis P and the stretching direction E may be slightly changed according to whether a stretched portion of the polarizer is the center or periphery thereof.

In the example embodiment shown in FIG. 3, a first polarizer plate 402 is cut at an angle ($\alpha'$) with respect to the absorption axis P of the polarizer 400. The cutting angle ($\alpha'$) of the first polarizer plate may be set in the range of $-0.2$ to $-0.1$ degrees. When the cutting angle $\alpha'$ is set in the range of $-0.2$ to $-0.1$ degrees, the first polarizer plate may have an absorption axis inclination ($\alpha$) in the range of $+0.1$ to $+0.2$ degrees. For example, in order to set the absorption axis inclination ($\alpha$) of the first polarizer plate to $+0.17$ degrees, the first polarizer plate may be cut at an inclined angle of $-0.17$ degrees with respect to the absorption axis P of the polarizer 400. With the cutting angle ($\alpha'$) and the absorption axis inclination ($\alpha$) of the first polarizer plate within these ranges, the liquid crystal display may have a significantly improved contrast ratio.

In the example embodiment shown in FIG. 3, a second polarizer plate 404 is cut at an angle ($\beta'$) with respect to a vertical direction to the absorption axis P of the polarizer 400. The cutting angle ($\beta'$) of the second polarizer plate may be set in the range of $-0.1$ to $+0.04$ degrees, excluding 0 degrees. When the cutting angle ($\beta'$) is set in the range of $-0.1$ to $+0.04$ degrees excluding 0 degrees, the resulting second polarizer plate may have an absorption axis inclination ($\beta$) in the range of $-0.04$ to $+0.1$ degrees, excluding 0 degrees. For example, in order to set the absorption axis inclination ($\beta$) of the second polarizer plate 404 to $+0.05$ degrees, the second polarizer plate may be cut at an inclined angle ($\beta'$) of $-0.05$ degrees with respect to a vertical direction to the absorption axis P of the polarizer 400. With the cutting angle ($\beta'$) and the absorption axis inclination (β) of the second polarizer plate in these ranges, the liquid crystal display may have a significantly improved contrast ratio.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

A description of details apparent to those skilled in the art will be omitted herein.

EXAMPLE AND COMPARATIVE EXAMPLE

First and second polarizer plates were manufactured by the method described above with different cutting angles and attached to a liquid crystal panel to measure the contrast ratio. The first polarizer plate had a single transmittance of 41.2%±0.2% and a degree of polarization of 99.995% or more, and the second polarizer plate had a single transmittance of 42.0%±0.2% and a degree of polarization of 99.995% or more.

Measurement of Inclined Angle of Absorption Axis

In the following examples and comparative examples, the inclined angle (α or β) of the absorption axis was measured using an Axoscan system (Axometrics Co., Ltd.).

Measurement of Contrast Ratio

In the following examples and comparative examples, after measuring an absorption axis inclination of each of samples cut to a size of 50×50 mm$^2$, each sample was attached to a 32 inch liquid crystal panel (Model LTA320AP02, Samsung Electronics Co., Ltd.), followed by measuring the contrast ratio using a brightness tester SR-3A (Topcon Co., Ltd.).

Examples 1 to 6 and Comparative Examples 1 to 12

Figure 4:
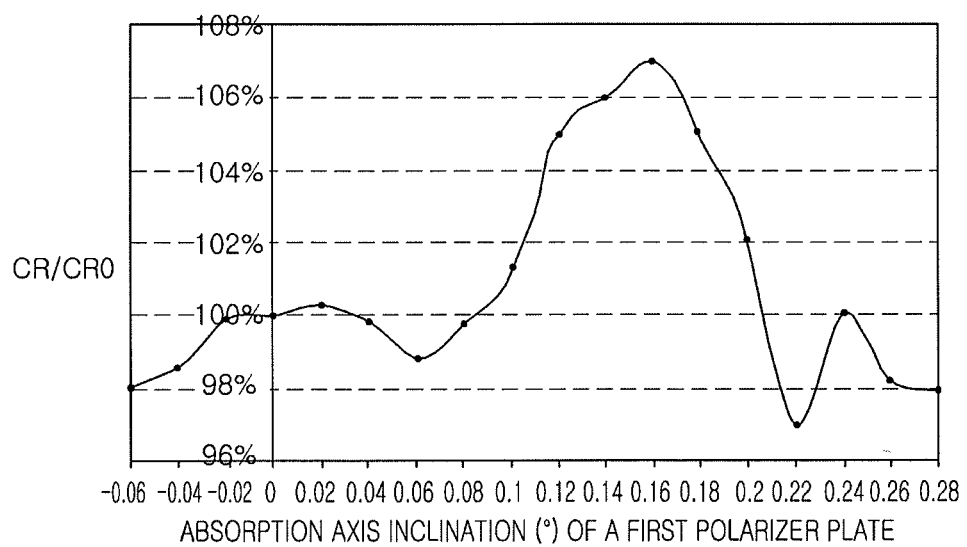
FIG. 4 illustrates a graph depicting a relationship between a contrast ratio and an absorption axis inclination of a first polarizer plate.

The polarizer plates were attached to a liquid crystal panel to measure the contrast ratio, in which the absorption axis inclination (α) of the first polarizer plate was changed by 0.02 degrees from −0.06 degrees to +0.28 degrees, with the absorption axis inclination (β) of the second polarizer plate maintained at 0 degrees. Table 1 and FIG. 4 show results of measuring the absorption axis inclination (α) of the first polarizer plate and the contrast ratio (CR) of the liquid crystal display. In Table 1 and FIG. 4, CR0 indicates the contrast ratio of the liquid crystal display when the absorption axis inclinations (α, β) of the first and second polarizer plates were 0 degrees.

From Table 1 and FIG. 4, it can be seen that, when the first polarizer plate has an absorption axis inclination (α) (FIG. 1) of +0.1 to +0.2 degrees, the liquid crystal panel had a superior contrast ratio to the case in which the first polarizer plate had an absorption axis inclination (α) of 0 degrees. Thus, it can be seen that a slightly inclined absorption axis of the polarizer plate provides a superior contrast ratio to a typical structure wherein the first polarizer plate and the second polarizer plate are stacked orthogonally.

TABLE 1

|  | Absorption axis inclination of first polarizer plate (degrees) | Absorption axis inclination of second polarizer plate (degrees) | CR | CR/CR0 |
| --- | --- | --- | --- | --- |
| Comp. Ex. 1 | −0.06 | 0 | 4,968 | 98.0% |
| Comp. Ex. 2 | −0.04 | 0 | 4,998 | 98.6% |
| Comp. Ex. 3 | −0.02 | 0 | 5,064 | 99.9% |
| Comp. Ex. 4 | 0 | 0 | 5,069 | 100.0% |
| Comp. Ex. 5 | +0.02 | 0 | 5,084 | 100.3% |
| Comp. Ex. 6 | +0.04 | 0 | 5,059 | 99.8% |
| Comp. Ex. 7 | +0.06 | 0 | 5,008 | 98.8% |
| Comp. Ex. 8 | +0.08 | 0 | 5,059 | 99.8% |
| Ex. 1 | +0.1 | 0 | 5,135 | 101.3% |
| Ex. 2 | +0.12 | 0 | 5,322 | 105.0% |
| Ex. 3 | +0.14 | 0 | 5,373 | 106.0% |
| Ex. 4 | +0.16 | 0 | 5,424 | 107.0% |
| Ex. 5 | +0.18 | 0 | 5,322 | 105.0% |
| Ex. 6 | +0.2 | 0 | 5,170 | 102.0% |
| Comp. Ex. 9 | +0.22 | 0 | 4,917 | 97.0% |
| Comp. Ex. 10 | +0.24 | 0 | 5,072 | 100.1% |
| Comp. Ex. 11 | +0.26 | 0 | 4,978 | 98.2% |
| Comp. Ex. 12 | +0.28 | 0 | 4,968 | 98.0% |

Examples 7 to 13 and Comparative Examples 13 to 20

Figure 5:
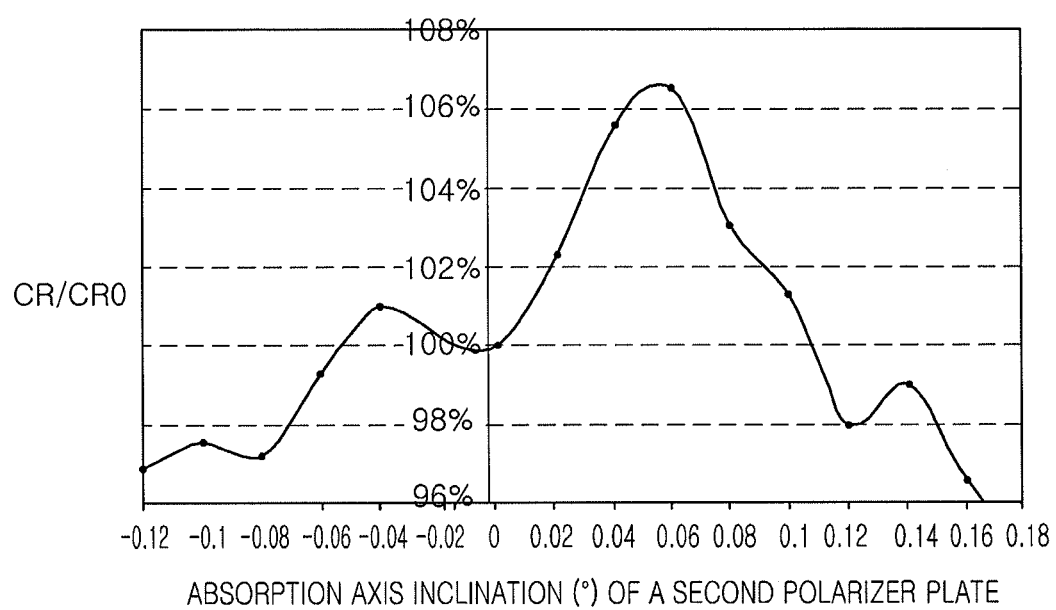
FIG. 5 illustrates a graph depicting a relationship between a contrast ratio and an absorption axis inclination of a second polarizer plate.

The polarizer plates were attached to a liquid crystal panel to measure contrast ratio, in which the absorption axis inclination (β) of the second polarizer plate was changed by 0.02 degrees from −0.12 to +0.18 degrees, with the absorption axis inclination (α) of the first polarizer plate maintained at 0 degrees. The following Table 2 and FIG. 5 show measurement results thereof. In Table 2 and FIG. 5, CR0 indicates the contrast ratio of the liquid crystal display when the absorption axis inclination (α) of the first polarizer plate and the absorption axis inclination (β) of the second polarizer plate are 0 degrees.

From Table 2 and FIG. 5, it can be seen that when the second polarizer plate had an absorption axis inclination (β) (FIG. 1) of −0.04 to +0.1 degrees, the liquid crystal panel had a superior contrast ratio to the case where the second polarizer plate had an absorption axis inclination of 0 degrees.

TABLE 2

|  | Absorption axis inclination of first polarizer plate (degrees) | Absorption axis inclination of second polarizer plate (degrees) | CR | CR/CR0 |
| --- | --- | --- | --- | --- |
| Comp. Ex. 13 | 0 | −0.12 | 4,912 | 96.9% |
| Comp. Ex. 14 | 0 | −0.1 | 4,942 | 97.5% |
| Comp. Ex. 15 | 0 | −0.08 | 4,927 | 97.2% |
| Comp. Ex. 16 | 0 | −0.06 | 5,034 | 99.3% |
| Ex. 7 | 0 | −0.04 | 5,120 | 101.0% |
| Ex. 8 | 0 | −0.02 | 5,094 | 100.5% |
| Ex. 9 | 0 | +0.02 | 5,186 | 102.3% |
| Ex. 10 | 0 | +0.04 | 5,353 | 105.6% |
| Ex. 11 | 0 | +0.06 | 5,398 | 106.5% |
| Ex. 12 | 0 | +0.08 | 5,221 | 103.0% |
| Ex. 13 | 0 | +0.1 | 5,135 | 101.3% |
| Comp. Ex. 17 | 0 | +0.12 | 4,968 | 98.0% |
| Comp. Ex. 18 | 0 | +0.14 | 5,018 | 99.0% |
| Comp. Ex. 19 | 0 | +0.16 | 4,892 | 96.5% |
| Comp. Ex. 20 | 0 | +0.18 | 4,816 | 95.0% |

Examples 14 to 16 and Comparative Example 21

The following Table 3 shows results of measuring the contrast ratio (CR) of the liquid crystal display, in which both the absorption axis inclination of the first polarizer plate and the absorption axis inclination of the second polarizer plate were changed. In Table 3, CR0 indicates the contrast ratio of the liquid crystal display when the absorption axis inclinations (α, β) of the polarizer plates are 0 degrees.

As can be seen from the following Table 3, when the first polarizer plate had an absorption axis inclination of +0.1 to +0.2 degrees or the second polarizer plate had a non-zero absorption axis inclination of −0.04 to +0.1 degrees, the liquid crystal panel had a significantly improved contrast ratio, as compared with a typical structure in which the first and second polarizer plates have an absorption axis inclination of 0 degrees. Further, in Comparative Example 21, in which the second polarizer plate had an absorption inclination not in the range of −0.04 to +0.1 degrees, the contrast ratio was significantly lower.

TABLE 3

|  | Absorption axis inclination of first polarizer plate (degrees) | Absorption axis inclination of second polarizer plate (degrees) | CR | CR/CR0 |
| --- | --- | --- | --- | --- |
| Ex. 14 | +0.17 | +0.05 | 5,331 | 105.6% |
| Ex. 15 | +0.16 | −0.04 | 5,367 | 105.9% |
| Ex. 16 | +0.20 | +0.05 | 5,104 | 100.7% |
| Comp. Ex. 21 | +0.05 | −0.12 | 4,998 | 98.6% |

By way of summation and review, a polarizer plate includes a polarizer, for polarizing light in a specific direction, and a protective layer, for supporting and protecting the polarizer. The polarizer is generally prepared by dyeing a polyvinyl alcohol film with dichroic iodine, followed by cross-linking the film with boric acid or borax and stretching.

Vertical arrangement mode and horizontal arrangement mode liquid crystal panels (liquid crystal cells) having a wide viewing angle may be used together with conventional twisted nematic (TN) liquid crystal displays. In general, polarizer plates mounted on upper and lower surfaces of the liquid crystal panel are typically arranged to have absorption axes dislocated at 90 degrees with respect to each other. It may be possible to increase the contrast ratio of the liquid crystal display by changing the materials and stretching process of the polarizer plates. However, a relationship between the absorption axes of the upper and lower polarizer plates according to embodiments may also be used to increase the contrast ratio.

As described above, a method of manufacturing a polarizer plate according to an embodiment may provide improvements in contrast ratio of a liquid crystal display. The liquid crystal display may have a significantly improved contrast ratio through an optimal cutting process in manufacture of a polarizer plate. Thus, a liquid crystal display including one or more polarizer plates according to embodiments may exhibit improvements in contrast ratio.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display, comprising:
    a liquid crystal panel;
    a first polarizer plate stacked on an upper surface of the liquid crystal panel; and
    a second polarizer plate stacked on a lower surface of the liquid crystal panel,
    wherein:
    the first polarizer plate has an absorption axis inclination of greater than +0.1 to less than or equal to +0.2 degrees, or
    the second polarizer plate has an absorption axis inclination of −0.04 to less than 0 or greater than 0 to less than +0.1 degrees.

2. The liquid crystal display as claimed in claim 1, wherein the first polarizer plate has an absorption axis inclination of greater than +0.1 to less than or equal to +0.2 degrees.

3. The liquid crystal display as claimed in claim 2, wherein the second polarizer plate has an absorption axis inclination of −0.04 to less than 0 or greater than 0 to less than +0.1 degrees.

4. The liquid crystal display as claimed in claim 1, wherein the second polarizer plate has an absorption axis inclination of −0.04 to less than 0 or greater than 0 to less than +0.1 degrees.

5. The liquid crystal display as claimed in claim 1, wherein at least one of the first polarizer plate and the second polarizer plate includes:
    a polarizer;
    a first protective film stacked on an upper surface of the polarizer; and
    a second protective film stacked on a lower surface of the polarizer.

6. The liquid crystal display as claimed in claim 5, further comprising a compensation film stacked on a lower surface of the second protective film.

7. The liquid crystal display as claimed in claim 5, wherein at least one of the first protective film and the second protective film is a tri-acetyl-cellulose film.

8. The liquid crystal display as claimed in claim 1, wherein the liquid crystal panel includes an upper substrate, a lower substrate, and liquid crystals between the upper and lower substrates, the liquid crystals being vertical arrangement mode liquid crystals.

9. A method of manufacturing a polarizer plate, the method comprising:
    preparing a polarizer;
    attaching a protective film to at least one side of the polarizer to prepare a polarizer plate; and
    cutting the polarizer plate at an inclined angle except for 0 or 90 degrees with respect to an absorption axis of the polarizer, wherein:
    the inclined angle is in the range of −0.2 to less than −0.1 degrees with respect to the absorption axis, or
    the inclined angle is in the range of greater than −0.1 to less than 0 or greater than 0 to less than or equal to +0.04 degrees with respect to a vertical direction to the absorption axis.

10. The method as claimed in claim 9, wherein the inclined angle is in the range of −0.2 to less than −0.1 degrees with respect to the absorption axis.

11. The method as claimed in claim 9, wherein the inclined angle is in the range of greater than −0.1 to less than 0 or greater than 0 to less than or equal to +0.04 degrees with respect to the vertical direction to the absorption axis.

12. The method as claimed in claim 9, wherein the polarizer is prepared from a polyvinyl alcohol film.

13. The method as claimed in claim 12, wherein preparing the polarizer includes stretching the polarizer in a stretching direction, and the absorption axis of the polarizer has the same direction as the stretching direction of the polarizer.

14. The method as claimed in claim 13, wherein preparing the polarizer includes rinsing and swelling a polyvinyl alcohol film, dyeing the swollen polyvinyl alcohol film, stretching the dyed polyvinyl alcohol film in the stretching direction, and color-correcting the stretched polyvinyl alcohol film.

15. The liquid crystal display as claimed in claim 1, wherein an absolute value of the absorption axis inclination of the second polarizer plate is greater than an absolute value of the absorption axis inclination of the first polarizer plate.

16. The liquid crystal display as claimed in claim 1, wherein the second polarizer plate has an absorption axis inclination of −0.04 to less than 0 degrees, and an absolute value of the absorption axis inclination of the first polarizer plate is greater than an absolute value of the absorption axis inclination of the second polarizer plate.

\* \* \* \* \*